US006532297B1

(12) United States Patent
Lindquist

(10) Patent No.: US 6,532,297 B1
(45) Date of Patent: Mar. 11, 2003

(54) GAMBLING CHIP RECOGNITION SYSTEM

(75) Inventor: Thomas Lindquist, Eden Prairie, MN (US)

(73) Assignee: Digital Biometrics, Inc., Minnetonka, MN (US)

(*) Notice: Subject to any disclaimer, the term of this patent is extended or adjusted under 35 U.S.C. 154(b) by 0 days.

(21) Appl. No.: 09/115,328

(22) Filed: Jul. 14, 1998

Related U.S. Application Data

(63) Continuation-in-part of application No. 08/962,915, filed on Oct. 27, 1997, now Pat. No. 5,781,647.

(51) Int. Cl.[7] .......... G06K 9/00
(52) U.S. Cl. .......... 382/100; 101/493; 205/582
(58) Field of Search .......... 335/375, 494; 101/493; 282/107, 100; 205/582

(56) References Cited

U.S. PATENT DOCUMENTS

| | | | | |
|---|---|---|---|---|
| 2,410,854 | A | 11/1946 | Snell et al. | 194/912 |
| 2,983,354 | A | 5/1961 | Ember et al. | 194/211 |
| 3,106,101 | A | 10/1963 | Kolanowski et al. | 341/176 |
| 3,109,990 | A | 11/1963 | Shuba | 235/454 |
| 3,145,291 | A | 8/1964 | Brainerd | 377/28 |
| 3,171,020 | A | 2/1965 | Lord | 235/454 |
| 3,253,126 | A | 5/1966 | Baughman | 235/468 |
| 3,350,802 | A | 11/1967 | Segel | 40/275 |
| 3,421,148 | A | 1/1969 | Howells et al. | 714/752 |
| 3,426,879 | A | 2/1969 | Walker | 194/207 |
| 3,526,971 | A | 9/1970 | Shipley | 435/335 |
| 3,541,310 | A | 11/1970 | States | 235/454 |
| 3,543,007 | A | 11/1970 | Brinker et al. | 235/436 |
| 3,617,707 | A | 11/1971 | Shields et al. | 235/462.17 |
| 3,636,317 | A | 1/1972 | Torrey | 235/494 |
| 3,643,068 | A | 2/1972 | Mohan et al. | 235/462.3 |
| 3,671,722 | A | 6/1972 | Christie | 235/494 |
| 3,766,452 | A | 10/1973 | Burpee et al. | 194/214 |
| 3,768,071 | A | 10/1973 | Knauft et al. | 714/6 |
| D232,367 | S | 8/1974 | Garaventa | 254/110 |
| 3,829,661 | A | 8/1974 | Silverman et al. | 235/382 |
| D237,724 | S | 11/1975 | Garaventa | 280/107 |
| 3,926,291 | A | 12/1975 | Burke et al. | 194/213 |
| D240,053 | S | 5/1976 | Garaventa | 369/173 |
| 3,953,932 | A | 5/1976 | Graves | 40/27.5 |
| 3,968,582 | A | 7/1976 | Jones | 40/27.5 |
| 3,983,646 | A | 10/1976 | Howard | |
| 3,987,278 | A | 10/1976 | Van Elzakker et al. | 235/436 |
| 4,026,309 | A | 5/1977 | Howard | 377/7 |
| 4,087,092 | A | 5/1978 | Krause et al. | 435/17 |
| 4,133,044 | A | 1/1979 | Gariazzo et al. | 365/78 |
| 4,139,219 | A | 2/1979 | Herndon | 283/57 |
| 4,157,829 | A | 6/1979 | Goldman et al. | 463/12 |
| 4,160,522 | A | 7/1979 | Dikinis | 235/454 |
| 4,191,376 | A | 3/1980 | Goldman et al. | 399/272 |
| 4,234,214 | A | 11/1980 | Lee | 283/57 |
| 4,283,709 | A | 8/1981 | Lucero et al. | 463/25 |
| 4,293,766 | A | 10/1981 | Long et al. | 235/454 |
| 4,371,071 | A | 2/1983 | Abedor et al. | 194/212 |

(List continued on next page.)

6,176,185 B1 * 1/2001 Charlier et al. .......... 101/493

FOREIGN PATENT DOCUMENTS

DE 44 39 502 C1 9/1995 .......... G06K/7/00

*Primary Examiner*—Leo Boudreau
*Assistant Examiner*—M. B. Choobin
(74) *Attorney, Agent, or Firm*—Merchant & Gould P.C.

(57) ABSTRACT

A computer implemented gambling chip recognition system having the ability to capture an image of a stack of gambling chips and automatically processing the image to determine the number of chips within the stack and the value of each. The system processor determines the classification for each chip in a stack by way of processing performed in real time on the image of the stack of gambling chips. The system further includes the ability to communicate the information derived from the stack of gambling chips to a video monitor and the ability to communicate the information to a main database where information is being compiled and stored about an individual gambler.

1 Claim, 3 Drawing Sheets

U.S. PATENT DOCUMENTS

| | | | | | |
|---|---|---|---|---|---|
| 4,430,177 | A | | 2/1984 | McIntyre et al. | 250/532 |
| 4,435,911 | A | | 3/1984 | Jones | 40/27.5 |
| 4,449,042 | A | | 5/1984 | Hampson et al. | 235/454 |
| 4,463,250 | A | | 7/1984 | McNeight et al. | 235/385 |
| 4,493,989 | A | | 1/1985 | Hampson et al. | 235/385 |
| 4,506,914 | A | | 3/1985 | Gobeli | 283/70 |
| 4,509,632 | A | | 4/1985 | Jaffe | 194/212 |
| 4,531,187 | A | | 7/1985 | Uhland | 463/12 |
| 4,567,361 | A | | 1/1986 | Rosenthal | 235/462.17 |
| 4,685,147 | A | | 8/1987 | Honjo | 382/311 |
| 4,764,666 | A | | 8/1988 | Bergeron | 463/25 |
| 4,814,589 | A | | 3/1989 | Storch et al. | 235/375 |
| 4,841,129 | A | | 6/1989 | Tawara et al. | 235/462.39 |
| 4,899,392 | A | | 2/1990 | Merton | 382/136 |
| 4,924,088 | A | | 5/1990 | Carman et al. | 250/271 |
| 4,926,327 | A | | 5/1990 | Sidley | 463/13 |
| 5,103,081 | A | | 4/1992 | Fisher et al. | 235/462.03 |
| 5,173,589 | A | | 12/1992 | Diehl et al. | 235/375 |
| 5,235,618 | A | | 8/1993 | Sakai et al. | 252/67 |
| 5,259,613 | A | | 11/1993 | Marnell, II | 462/42 |
| 5,283,422 | A | | 2/1994 | Storch et al. | 235/375 |
| 5,321,241 | A | | 6/1994 | Craine | 463/25 |
| 5,326,104 | A | | 7/1994 | Pease et al. | |
| 5,387,785 | A | | 2/1995 | Gatto et al. | 235/454 |
| 5,411,258 | A | | 5/1995 | Wilson et al. | 463/6 |
| 5,414,251 | A | | 5/1995 | Durbin | 235/462.2 |
| 5,781,647 | A | * | 7/1998 | Fishbine et al. | 382/100 |
| 5,794,532 | A | * | 8/1998 | Gassies et al. | 101/493 |

* cited by examiner

GAMBLING CHIP RECOGNITION SYSTEM

The present application is a continuation-in-part application of application Ser. No. 08/962,915, filed on Oct. 27, 1997 and issued Jul. 14, 1998 as U.S. Pat. No. 5,781,647.

APPENDIX

This specification includes an Appendix which includes 133 pages. The appendix includes computer source code of one preferred embodiment of the invention. In other embodiments of the invention, the inventive concept may be implemented in other computer code, in computer hardware, in other circuitry, in a combination of these, or otherwise. The Appendix is hereby incorporated by reference in its entirety and is considered to be a part of the disclosure of this specification.

A CD-ROM containing appendix A, source code, filed on Jul. 14, 1998.

FIELD OF THE INVENTION

The present invention relates to a computer implemented system for capturing and processing an image of a stack of gambling chips for counting the number of chips and determining the value of each within the stack.

BACKGROUND OF THE INVENTION

In the casino business there is an established reward/perk system that is used to determine the level of complimentary benefits valued customers should receive. Presently, this system is managed and performed by a person such as a casino supervisor/floor manager. The supervisor/floor manager keeps detailed notes about certain players and tries to determine over an extended period, the length of time a player gambles, the total amount of money bet in one sitting, the average amount wagered at each bet, etc. By knowing the value of a player's wagers and their gambling habits, the casino decides which players are to receive complimentary benefits. The level of benefits is determined by a player's level of gambling.

Presently, a player's level of gambling is determined solely by the notes of the gambling floor supervisor/manager. This is a very subjective system that is often difficult to maintain because a floor/manager cannot watch all players at all times to get accurate information on betting habits.

There is a need for a system that assists gambling operations at casinos in accurately tracking the gambling habits of its customers. Such a system would be helpful to a casino by making the reward/perk system more consistent. The reward/perk system would better serve its purpose because the guess work would be taken out of determining a player's gambling habits. Knowing exactly the length of the time played, amount of money bet and average amount wagered at each bet would be very helpful in providing the right incentives and complimentary benefits (free meals, limo, room, etc.) to the right players. Such a system could also be used to determine a player's pre-established credit rating.

DESCRIPTION OF THE PRIOR ART

In the past, gambling chip recognition systems such as that disclosed in U.S. Pat. No. 4,814,589 to Storch et al involved counting gambling chips and detecting counterfeit chips using a binary code placed on the edge of the chip. The system is designed to count chips and detect counterfeits at a gaining table while the chips are in a rack. Using this data, a casino could monitor the number of available chips and other statistical information about the activity at individual tables. One of the problems with the system disclosed in U.S. Pat. No. 4,814,589 is that the system requires the disc-like objects, such as gambling chips, coins, tokens, etc., have machine readable information encoded about the periphery thereof. Another system having similar problems is disclosed in U.S. Pat. No. 5,103,081 to Fisher. It describes a gambling chip with a circular bar code to indicate the chips denomination, authenticity and other information. The chip validating device rotates the chip in order to read the circular bar code.

The above mentioned prior art systems are particularly cumbersome in that they require chips to be housed within a particular system and rotated to be read or positioned at the right angle or in a rack so that the information can be taken from the periphery of the chips. There is a need for a system that can determine the value of gambling chips without encoding the periphery of each chip to enable system determination of its value. There is a need for a system that can determine the value of a chip without it being housed within a special reading device. There is a need for a system that can read a conventionally styled, conventionally fabricated chip that is positioned at any angle on a gaming table in the betting position. Such a system could cut down on casino expenses by deleting the cost to encode such chips with readable information.

SUMMARY OF THE INVENTION

The present invention is a casino gambling chip recognition system that provides for the automatic determination of the number of chips within a stack of gambling chips and the value of each chip within the stack through the use of a classification scheme stored in the computer wherein the classification scheme may utilize data (parameters) related to the geometry, color, feature pattern and size of each type (value) of chip in a preselected family of chips. The classification scheme data is used as a reference for a real time captured image of the stack of gambling chips. The system captures an image of the stack of gambling chips and processes the image by first detecting the boundaries of each chip in the image and then analyzing the degree of consistency between the data extracted from a given chip's area within the image and the classification scheme's parameters for all possible chip types. The system assigns the chip the value for which the classification scheme's parameters are most consistent with the data extracted from that chip's area within the image, provided that the degree of consistency is greater than some predefined minimum acceptable degree of consistency. If none of the classification parameters for any chip type are sufficiently consistent with the extracted data for a given chip in the image, that chip is assigned an "undefined" value. When the analysis of the extracted data from each chip position in the image of the stack has been completed, the system displays the total number of chips which were found and their total monetary value, obtained by summing all the defined and assigned chip values from that image. The system also provides the communication of the number and value of chips wagered by players to a main computer for storage in a centralized player data base. It may also log the occurrences of chips for which an assigned value could not be defined.

GENERAL DESCRIPTION OF THE INVENTION

The present invention is a gambling chip recognition system comprising a processor, data storage, an imager and a communication link. The gambling chip recognition system images a stack of gambling chips. The image of the gambling chip stack is processed by the processor to first derive from the image the locations of the chips within the stack and secondly the type (value) of each chip within the stack. The number of chips in the stack and the value of each chip within the stack may be communicated by way of a real time display monitor or to another main system database, via the communication link, where information is collected about individual gamblers.

DETAILED DESCRIPTION OF THE INVENTION

As required, detailed embodiments of the present invention are disclosed herein. However, it is to be understood that the disclosed embodiment is merely exemplary of the invention, which may be embodied in various forms. Therefore, specific structural and functional details disclosed herein are not to be interpreted as limiting but rather as the basis for the claims and as a representative basis for teaching one skilled in the art to employ the present invention in virtually any appropriately detailed system.

Figure 1:
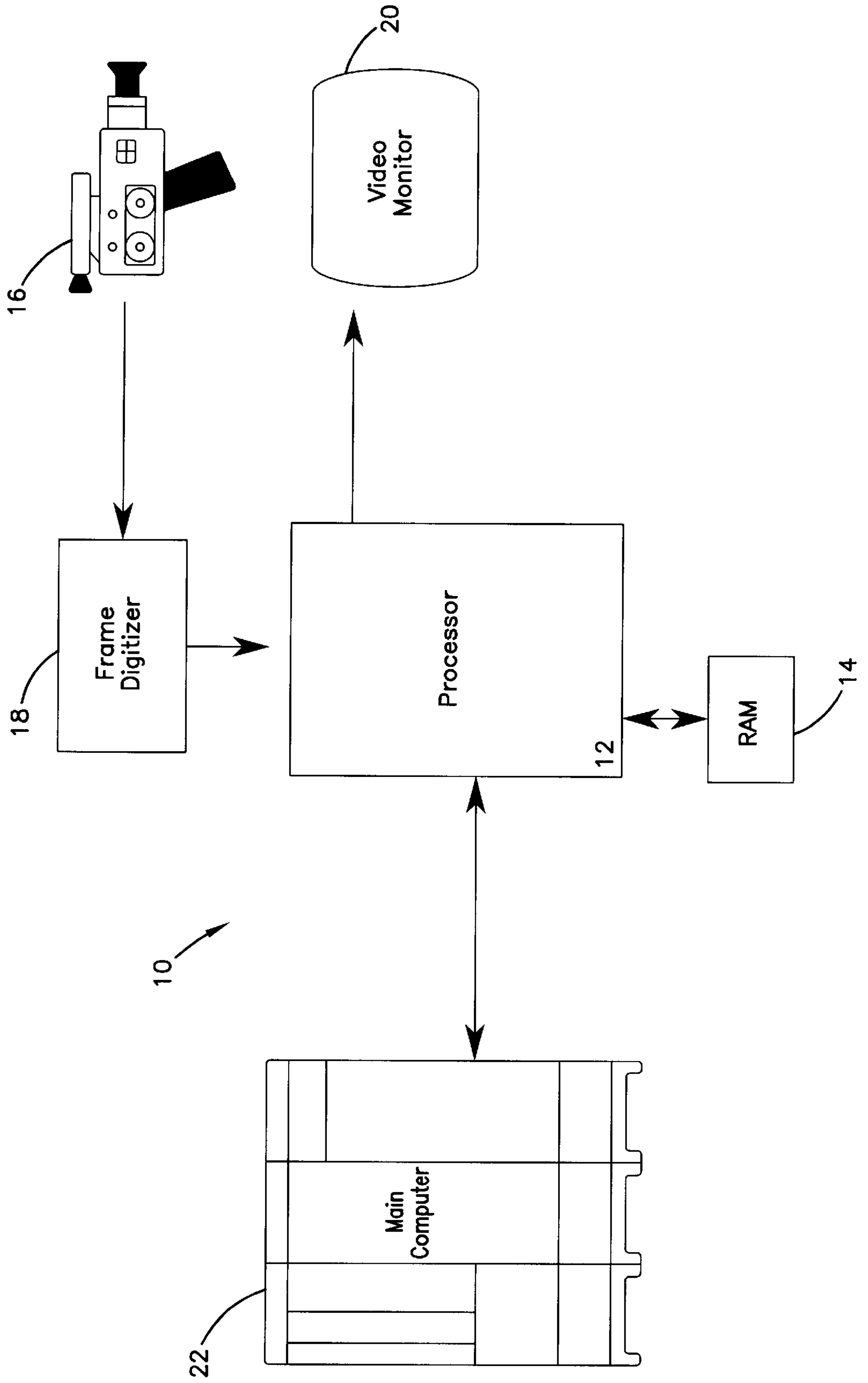
FIG. 1 is a block diagram representation of a system which can be used to capture and process a stack of gambling chips in accordance with the present invention.

Referring to the drawings, an embodiment of the gambling chip recognition system is illustrated generally in FIG. 1. Gambling chip recognition system 10 is a microprocessor based system which includes a processor 12, data storage 14, an imager 16, a digitizer 18, a monitor 20 and a communication link. The data storage 14 will typically accommodate both short-term data storage, for items such as the most recent stack images, and longer-term storage, for items such as the parameters characterizing the set of chips being used and the classification software itself. In the embodiment shown in FIG. 1, a stack of gambling chips is imaged by a video camera 16 and digitized by the frame grabber digitizer 18. During data analysis by the processor 12 a digitized image is accessed (typically through normal operating system memory and/or file management software) in data storage 14 as an array of digital data representative of the gambling chip stack which was imaged. The processor processes the data in accordance with a computational program to derive from the image the count of chips and the value of each chip within the stack. The results may be communicated to the system user by way of a video monitor 20 or communicated to another system where the resultant information is added to a player database within the main computer 22 where information is collected about individual gamblers. It is to be understood that this invention is not limited to the above-mentioned methods for communicating resultant information. The above methods are listed as examples of methods used in the embodiment disclosed in FIG. 1.

The gambling chip recognition system imager 16 is comprised of a plurality of video cameras, one for each gambling position on the gaming table. Each camera being commercially available and using conventional rasters and scanning rates. The gambling chip recognition system 10 illustrated in FIG. 1, shows only one video camera 16. It is to be understood that the present embodiment can utilize any number of video cameras. The number of cameras is determined by the number of gambling positions that need to be monitored. For purposes of illustration and simplifying the description, one camera is described and shown.

The imager 16 may be implemented in a plurality of different ways. For example, in another embodiment (not shown), the imager 16 is a high resolution camera mounted in relation to a gaming table such that a full view of all betting positions are within the camera's field of view. The camera continuously images all gambling chip stacks at the gaming table betting positions and generates frames of video signals representative thereof. In another embodiment, the imager is a single camera having a pan-tilt mechanism employed whereby the camera is repositioned and refocused on each gambling chip pile separately. It is to be understood that other embodiments of the imager may be utilized and that structural or logical changes to the system may be made without departing from the scope of the present invention.

Figure 2:
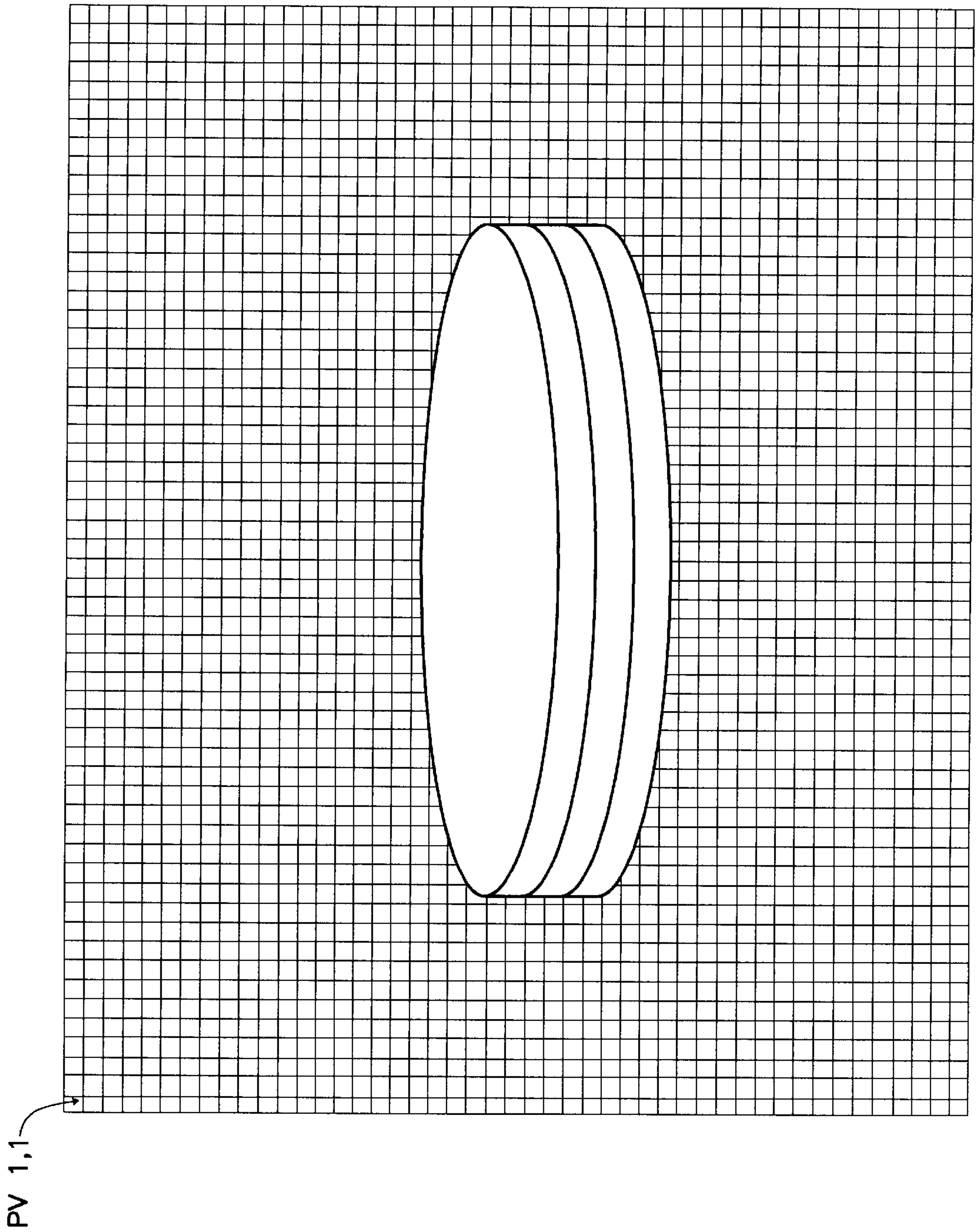
FIG. 2 is a graphical representation of the captured image of a stack of gambling chips after being digitized by the frame grabber shown in FIG. 1.

The digitizer 18 is electrically connected to the imager 16 and processor 12. The digitizer 18 is controlled by processor 12 and digitizes frames of video signals currently being generated by video camera 16 when commanded by the processor 12. Camera 16 continuously images a stack of gambling chips through its objective lens and generates frames of video signals representative thereof. The digitizer 18 produces two dimensional arrays of digital pixel values representative of the intensity and/or color of the pixel values of the video images captured by camera 16 at corresponding discrete pixel locations. An image array having pixel values PVr,c corresponding to a stack of gambling chips is illustrated in FIG. 2. Image arrays are formed by horizontal rows and vertical columns of pixel values (PVr,c).

In the embodiment shown in FIG. 1, the digitizer 18 captures a frame of a video signal generated by video camera 16 and digitizes the video image into an array of r=640 rows by c=480 columns of N-bit pixel values. The number of bits (N) in a pixel value is dependent upon the classification scheme employed. The classification scheme employed may be a grey-scale or color digital scale representation having N bits of image data for each pixel. The present embodiment utilizes 24 bits (N=24) of image data to represent an RGB color scale format. Each pixel in the 640 by 480 matrix of pixels consists of red, green and blue color components. Within each pixel having 24 bits of data, there are 8 bits of data representing red, 8 bits of data representing green and 8 bits of data representing blue. It can be appreciated that quantifying the three color components for each pixel in accordance with the above described 24 bit format provides up to $2^{24}$ color combinations. It is to be understood that there are other formats and embodiments for representing color pixel data. In some situations, the pixel data format may depend upon the particular CPU (Central Processing Unit), operating system, or other software used in the host computer system.

Image data from the digitizer 18 is stored in data storage 14, which provides computational access to derived data as well as to the acquired image. The data storage 14 may incorporate digital and/or analog storage devices, including conventional RAM, conventional disk, or a byte-sized register which passes bytes of digital data to the processor in a manner which permits serial access to the data. The serial stream of data flowing through the register into the processor may flow in a manner consistent with the computation even though only one byte may be available at each computational cycle.

The communications link 20 constitutes the devices which forward the results of the count and chip value determination performed by the processor. These devices include a video display whereby an operator can see the results of the processing displayed as a dollar value and count of the stack of chips, as well as digital communications whereby the data is conveyed to another computing system, i.e., via ethernet, wherein the betting information is stored in a conventional database containing an individual's transaction history.

The processor is a commercially available processor such as an Intel Pentium which permits manipulation of the digitized image to enable the derivation of chip information from the digital representation of the stack of gambling chips. The processing may be carried out entirely with one or more digital processors, but analog processing may also be used (for example, in edge detectors or various data conversion operations). The processing may be implemented in hardware, firmware, and or/software. The processing which needs to be performed includes (1) detection of the approximately horizontal edges at the upper and lower edges of each chip, (2) detection of the approximately vertical edges of the various "features" (for example, vertical strips of certain colors) occurring along the visible portion of the chip, (3) segmentation processing, during which the observed feature sequence for a chip is analyzed for compatibility with the predefined canonical feature sequences of each of the chip types of the chip set in use, (4) classifying the chip with the value of the chip type whose feature sequence is most consistent with the observed feature sequence, and (5) incorporating the classified values of all the chips in the stack into a grand total value which is reported for the current stack.

Figure 3:
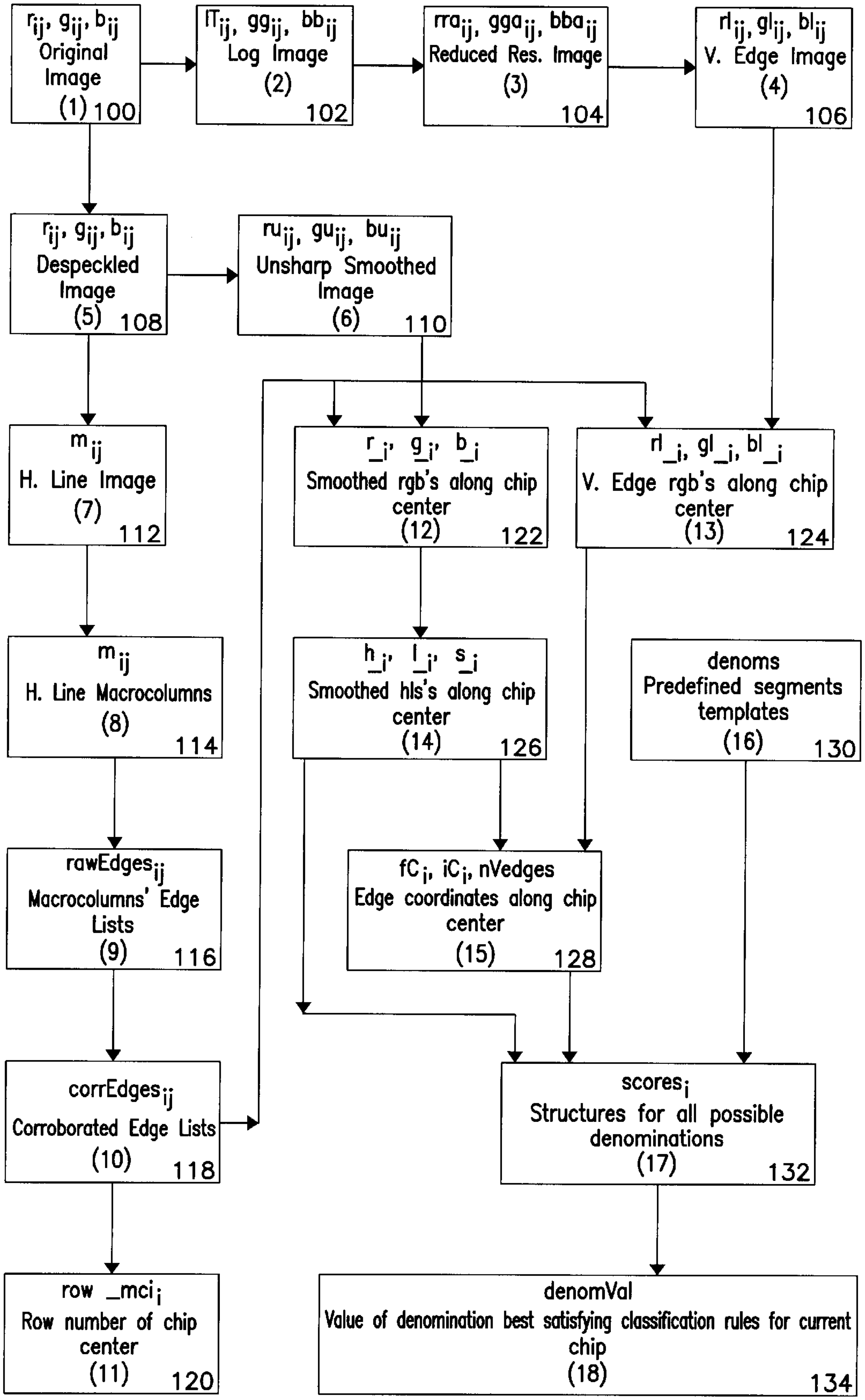
FIG. 3 is a diagram indicating the data structures and data flow in the current embodiment.

FIG. 3 presents a more detailed view of the data flow through the various processing steps which are used in this embodiment. Data processing begins with the acquisition of an original image 100, consisting of red, green, and blue component images, each of which is 640 columns by 480 rows by 8 bits. This is converted to a Log Image 102 by scaling and taking the logarithm of each 8-bit component image, with the resultant pixels stored as 16-bits per component. The Log Image pixels are approximately proportional to the logarithm of the original light level. Thus, subsequent convolution using a kernel which generates "vertical edge " differences from this image will produce edge image values which are primarily related to the relative diffuse reflection coefficient on the two sides of an edge, irrespective of the absolute light intensity at the edge.

Because the fine structure of the vertical edges is not as important as signal-to-noise ratio, the next processing stage generates a Reduced Resolution Image 104, with 320 columns by 240 rows having 16 bits per component, using the average of one 2×2 pixel group in the Log Image 102 to create one pixel in the Reduced Resolution Image 104.

Next, a Vertical Edge Image 106 is calculated by applying a vertical edge extracting kernel to the Reduced Resolution Image 104 (performing this operation independently on each of the three color components). This kernel consists of seven identical rows (to enhance signal to noise ratio by vertical averaging), each of which consists of the following seven coefficients: −1, −1, 0, 0, 0, 1, 1.

The Original Image 100 is also used as a source of horizontal edge (layer lines) extraction. This begins with a "despeckling" process, which suppresses specular highlights in the original image by (1) generating a total luminance image from the original r,g,b image, (2) locating anomalous horizontal segments in which a luminance pixel of sufficient brightness is surrounded by sufficiently dimmer left and right near-neighbors, and (3) replacing original r, g, and b pixels by an interpolation between the corresponding (r, g, or b) pixels at the endpoints of the anomalous segment, yielding the Despeckled Image 108. The Despeckled Image 108 is smoothed by applying a three column wide by seven row high unsharp mask, yielding an Unsharp Smoothed Image 110 which will be used for extraction of smooth color values in subsequent processing.

The Despeckled Image 100 is also used to generate a Horizontal Line Image 112 by (1) generating, at each pixel location, for each component (r, g, and b), five consecutive rows of data, each of which is horizontally averaged (using a thirteen column wide averaging interval), (2) calculating absolute differences between the center row average and its upper and lower neighbor rows' averages, (3) calculating an absolute difference between the center row average and the average of all four neighboring row averages, and (4) calculating a final, monochromatic pixel value of the Horizontal Line Image 112 based on a weighted sum of all these differences.

To build up a signal-to-noise ratio before edge detection, groups of thirty two columns at a time in Horizontal Line Image 112 are averaged into "Macrocolumns" 114, of which there are twenty, each of which is 480 elements long. Each of these is first vertically smoothed by averaging three consecutive elements, then scanned, top-to-bottom, for edges. When a change of at least ten is found over a span of two columns, the first subsequent local maximum is declared to be an edge and its location is stored in that macrocolumn's Edge List 116.

The twenty raw Edge Lists 116 are further processed by a "corroboration algorithm" which rejects edges which are not sufficiently close vertically to edges in adjacent macrocolurnns and groups the admissible edges into global (over all macrocolumns) Corroborated Edge Lists 118 such that top edges of the top chip have an index of zero in all macrocolumns where they are found, top edges of the second chip always have an index of one, etc.

The row coordinates to use in subsequent horizontal scanning of a given chip are obtained by (1) interpolating and extrapolating the defined edge (row coordinate) values into all macrocolumns where they are not already defined and (2) adding an offset equivalent to approximately one half of the (known in advance) chip thickness to the top edge coordinate for a given chip at a given macrocolumn. The resultant array of twenty row numbers (one for each macrocolumn) for a given chip is the Row Number of Chip Center 120.

The Row Number of Chip Center 120 is used to select r, g, and b values from Unsharp Smoothed Image 110, yielding one-dimensional arrays of Smoothed RGB's Along Chip Center 122. The Row Number of Chip Center 120 is also used to select r, g, and b values from V Edge Image 106, yielding one-dimensional arrays of V Edge RGB's Along Chip Center 122. The Smoothed RGB's Along Chip Center 120 are also converted, by normal RGB to HLS conversion equations, into suitably scaled, Smoothed HLS's Along Chip Center 124.

Segmentation of data extracted along the chip center is performed by declaring a feature edge to exist at any column where either (1) the V Edge r, g, or b value exceeds a certain threshold, or (2) a more gradual hue change of sufficient magnitude occurs (provided that the luminance and saturation values at that location are sufficiently high for hue values to be stable), or (3) a more gradual saturation change of sufficient magnitude occurs (provided that the luminance and saturation values at that location are sufficiently high for saturation values to be stable. The initial and final column numbers of each such edge are stored, along with the total number of such edges, in Edge Coordinates Along Chip Center 126.

Next, the observed sequence of extracted features for a given chip is compared with Predefined Segment Templates 128, which define the hue luminance, saturation, and length limits allowed for each feature of each denomination in the current chip set. (In actuality, hue is represented by two values, called Hx and Hy, representing the x and y projections of the angular coordinate, Hue.) For each candidate denomination (possible chip value), a Score Structure 130 is computed, including the number of each feature type which was encountered and the maximum encountered total length of contiguous features consistent with the sequential feature definitions contained in the Template 128 for that denomination.

Finally, a final Denomination Value 130 is calculated using certain classification rules. For example, the candidate denomination which yielded the greatest total length of contiguous features can be chosen, provided that there was at least one occurrence of the longest (or "background" defined feature type for that denomination.

What is claimed is:

1. A method for determining the number of chips and the value assigned each chip within a stacked pile of one or more gambling chips comprising the following steps:

detecting an upper horizontal edge and a lower horizontal edge for each chip within the stacked pile by performing the step of horizontal edge extraction which includes the following steps:

(a) generating at each pixel location, for each component, five consecutive rows of data, each of which is horizontally averaged;

(b) calculating absolute differences between a center row average and upper and lower neighboring row averages; and (c) calculating an absolute difference between the center row average and the average of all neighboring row averages; and (d) calculating a final monochromatic pixel value of the horizontal image based on a weighted sum of all these differences;

(2) detecting left and right vertical edges of features on the visible portion of the edge of each chip within the stacked pile to determine a chip features sequence for each chip;

(3) analyzing the chip features sequence for each chip to determine compatibility with one of a plurality of the previously stored chip features sequences; and assigning each chip within the stacked pile with a value based on the most consistent compatibility of the chip features sequence with one of the previously stored chip features sequences.

* * * * *

UNITED STATES PATENT AND TRADEMARK OFFICE

CERTIFICATE OF CORRECTION

PATENT NO. : 6,532,297 B1

DATED : March 11, 2003

INVENTOR(S) : Lindquist

It is certified that error appears in the above-identified patent and that said Letters Patent is hereby corrected as shown below:

Title page,

Item [63], Related U.S. Application Data, delete in its entirety and replace with:
-- This application is a Continuation-in-Part of U.S. Patent Application Serial No. 08/962,915, filed October 27, 1997, now U.S. Patent No. 5,781,647, which in turn is a continuation of U.S. Patent Application Serial No. 08/539,779, filed October 5, 1995, now abandoned. --

Signed and Sealed this

First Day of February, 2005

JON W. DUDAS

*Director of the United States Patent and Trademark Office*